Aug. 29, 1933.  J. P. RYAN  1,924,417
VALVE
Filed April 11, 1931

INVENTOR,
James P. Ryan,
BY
Harry W. Bowen.
ATTORNEY.

Patented Aug. 29, 1933

1,924,417

UNITED STATES PATENT OFFICE 1,924,417

VALVE

James P. Ryan, Easthampton, Mass.

Application April 11, 1931. Serial No. 529,439

3 Claims. (Cl. 137—161)

This invention relates to improvements in valves and more particularly a valve construction which is designed to be operated at a definite temperature for automatically permitting the valve to open or be lifted by the pressure in the line from its seat, when the temperature in the room reaches a definite point.

One of the particular uses of my valve is to relieve or permit the escape of the cooling liquid or inflammable gas in a refrigerating apparatus, should a fire occur in or near the place where the apparatus is located, whereby the valve will be automatically opened by the pressure in the pipe line of the apparatus upon a definite rise in temperature to permit the escape of the gas, as sulphur dioxide, or the cooling liquid, since oftentimes, the refrigerant that is used for cooling in refrigeration plants is highly inflammable and explosive when confined, unless relief is provided when subjected to undue heat.

It is designed to be manually operated for releasing the condition of the pressure in a pipe line. The operative parts are concealed from the observer; no packings or stuffing boxes of any kind are employed with their attendant leaking and replacements. It is designed to be automatic at a predetermined temperature to permit the contents of a pipe line to be drained off. No springs, chains or weights of any kind are employed in its construction or operation. The parts may be readily removed. In short, there is nothing to get out of order, as will appear from the detailed description with reference to the drawing.

Broadly, the invention comprises a valve member proper which is normally retained on its seat by means of an adjustable or rotatable cap, which engages the upper end of the valve stem.

One of the objects of my present invention is to permit the valve to be automatically raised from its seat by the pressure in a pipe line, when the cap is moved outwardly by being rotated, to relieve the pressure on the upper end of the valve stem, whereby when the cap is removed, a refrigerating or other system may be tested as to its normal working condition by pressing down on the end of the valve stem.

Located in a recess in the upper end of the rotatable or threadedly mounted cap is a fusible element which engages the upper end of the valve stem and which is designed to melt at a definite temperature, say 160° F. When this element melts, or forms a liquid, it releases the pressure on the valve stem and permits the valve to be automatically raised from its seat and the contents, either gaseous or liquid, to be discharged from the pipe system of a refrigeration or other plant, thus preventing a possible fire or explosion from this source, and loss of life and property, should an explosion occur, due to confined gas and having on provision of relieving undue pressure caused by exposure to undue heat.

Referring to the drawing.

Figure 1:
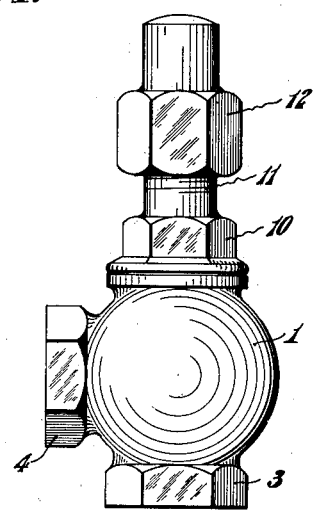
Fig. 1 is an elevational view showing the valve complete, or assembled.
Figure 2:
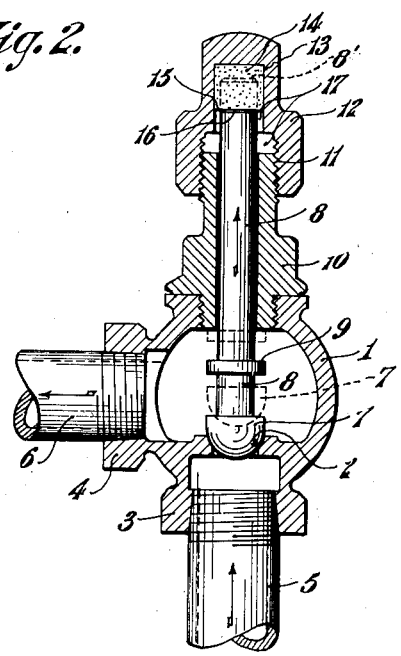
Fig. 2 is a vertical, sectional view of Fig. 1, showing the valve in full lines on its seat and in dotted lines, elevated by the pressure when the fusible material melts.

Referring to the drawing in detail:

1 designates the globe portion of the valve which is formed with a seat portion 2, preferably with a curved surface. 3 indicates the inlet end and 4 the outlet to which the pipes, 5 and 6, of a system are connected. The valve proper is indicated at 7, which is preferably semi-spherical in shape for engaging the curved seat 2. 8 designates the valve stem having a collar 9 thereon. The bonnet portion of the valve is indicated at 10, in which the valve stem 8 is loosely mounted for vertical movements. The upper end of the bonnet 10 is formed with a thread 11; 12 indicates a cap member that is threaded onto the bonnet 10. This cap member is formed with a recessed portion 13 in which is placed or poured the fusible material 14, the lower surface 15 of which rests directly upon the upper end 16 of the valve stem 8. When the cap member 12 is threaded down far enough on the threads 11, it will force the valve 7 onto its seat.

It should be observed that the diameter of the recessed portion 13 is greater than the diameter of the valve stem 8, as shown, whereby an annular space 17 is provided, which will permit the fusible material to readily flow downward thru this space when the external temperature reaches a definite point, say 160° F. When this occurs, the pressure of the liquid or gas in the pipe connection 5 will raise the valve 7 from its seat and permit the escape of the liquid or gas thru the pipe 6, thus removing any fire or explosion risk, due to the inflammable substance contained in the pipe line.

An important feature of my invention is that the operation of the refrigeration, or other system, may be tested by manual operation at any time by simply removing the cap 12, whereby the valve 7 will be raised by the pressure, as stated. This, I consider an important feature.

It is to be understood that I do not limit myself to any particular use of this valve construction, as it may be employed in any piping system, where a fire hazard would arise and also may be employed to test the system, without employing the fusible material 14, as it is obvious that the valve may be constructed by omitting the fusible material.

It will be noticed that, when the fusible material flows thru the annular space 17, the valve will be moved into the dotted line position 7' and the valve stem then assumes the dotted line position 8'. It will, therefore, be seen that when the fusible material 14 melts, the liquid or gas will flow through the pipes 5 and 6. The cap 12 may be replaced after this operation. As set forth above, the valve is simple, reliable, and inexpensive to make.

What I claim is:

1. A valve construction, for the purpose described, comprising a casing, a semi-spherical valve member having a seat in said casing, a valve stem, a bonnet formed with an opening in which the valve stem is located, said bonnet having a threaded portion, a cap member threaded onto the bonnet, said cap member being formed with a recessed portion, fusible material in the recessed portion which normally engages the valve stem for retaining the valve on its seat, whereby, when the fusible material reaches a fusible point at a definite temperature, the valve will be automatically raised by the internal pressure in a piping system.

2. In combination, a valve construction formed with a curved seat portion, a semi-spherical valve engaging the curved seat portion, a valve stem, a bonnet member having an aperture thru which the stem of the valve passes, said stem extending above the upper end of the bonnet member, a cap member secured to the bonnet member and having fusible material therein which engages the valve stem for retaining the valve on its seat, the cap member being constructed to permit the fusible material to escape around the valve stem when the fusible material reaches a definite temperature, whereby the internal pressure of the piping system will cause the valve to be raised from its seat.

3. A valve construction comprising a casing having an inlet and outlet opening with a valve seat between the openings, a valve engaging the valve seat, a valve stem connected to the valve, a bonnet member formed with an opening through the same in which the valve stem is loosely located, said stem normally projecting above the bonnet when the valve engages the seat, a recessed cap member removably connected to the bonnet, fusible material in the cap in contact with the end of the valve stem for normally holding the valve in engagement with its seat and for permitting the valve to be lifted from its seat when the fusible material is melted, said cap when removed, permitting the valve to be automatically lifted from its seat and thereafter be manually pressed on the end of the valve stem, as described.

JAMES P. RYAN.